United States Patent
Delaney et al.

(10) Patent No.: US 11,183,071 B2
(45) Date of Patent: Nov. 23, 2021

(54) DRONE FLIGHT OPTIMIZATION USING DRONE-TO-DRONE PERMISSIONING

(71) Applicant: International Business Machines Corporation, Armonk, NY (US)

(72) Inventors: Mark Delaney, Raleigh, NC (US); Brett Ward, Clayton, NC (US); Melissa Restrepo Conde, Raleigh, NC (US); William J. Green, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 137 days.

(21) Appl. No.: 16/118,578

(22) Filed: Aug. 31, 2018

(65) Prior Publication Data

US 2020/0074866 A1 Mar. 5, 2020

(51) Int. Cl.
*G08G 5/00* (2006.01)
*B64C 39/02* (2006.01)

(52) U.S. Cl.
CPC ......... *G08G 5/0008* (2013.01); *B64C 39/024* (2013.01); *G08G 5/0021* (2013.01); *G08G 5/0039* (2013.01); *G08G 5/0069* (2013.01); *B64C 2201/141* (2013.01)

(58) Field of Classification Search
CPC .. G08G 5/0008; G08G 5/0021; G08G 5/0039; G08G 5/0069; B64C 39/024; B64C 2201/141
See application file for complete search history.

(56) References Cited

U.S. PATENT DOCUMENTS

| 5,521,817 | A | 5/1996 | Burdoin et al. |
| 6,792,363 | B1 | 9/2004 | Bye |
| 8,543,265 | B2 | 9/2013 | Ekhaguere et al. |
| 9,524,648 | B1 * | 12/2016 | Gopalakrishnan ...... B64C 39/00 |
| 9,927,807 | B1 * | 3/2018 | Ganjoo ................... H04W 4/70 |
| 9,959,771 | B1 * | 5/2018 | Carlson ............... G08G 5/0039 |
| 9,964,951 | B1 * | 5/2018 | Dunn ................... G08G 5/0052 |
| 10,298,885 | B1 * | 5/2019 | Ludwig ............. H04N 5/23299 |
| 2006/0058931 | A1 | 3/2006 | Ariyur et al. |

(Continued)

FOREIGN PATENT DOCUMENTS

KR 20180074593 A * 7/2018

OTHER PUBLICATIONS

Machine Translation of KR20180074593A (Year: 2018).*

(Continued)

*Primary Examiner* — Anne Marie Antonucci
*Assistant Examiner* — Sahar Motazedi
(74) *Attorney, Agent, or Firm* — Cantor Colburn LLP; Tihon Poltavets

(57) ABSTRACT

Provided are embodiments drone flight optimization using drone to drone permissioning. The embodiments include determining a potential route for a first drone, and broadcasting the potential route to one or more drones of a network of drones. The embodiments also include receiving path information and routing condition information associated with the potential route from the one or more drones of the network of drones, and updating the potential route of the first drone based at least in part on the path information and routing condition information.

10 Claims, 6 Drawing Sheets

(56) References Cited

U.S. PATENT DOCUMENTS

| | | |
|---|---|---|
| 2010/0131121 A1 | 5/2010 | Gerlock |
| 2014/0249693 A1 | 9/2014 | Stark et al. |
| 2016/0140851 A1 | 5/2016 | Levy et al. |
| 2016/0189549 A1* | 6/2016 | Marcus ................ G08G 5/0039 701/3 |
| 2017/0052028 A1* | 2/2017 | Choudhury ............ G01C 21/30 |
| 2017/0320570 A1* | 11/2017 | Horn ....................... B64C 29/02 |
| 2018/0017973 A1* | 1/2018 | Teague .................. B64C 39/024 |
| 2018/0053403 A1* | 2/2018 | Wieskamp ............. H04L 47/14 |
| 2018/0170400 A1* | 6/2018 | Mahnke ................ G01S 13/878 |
| 2020/0011966 A1* | 1/2020 | Vermersch ............. G01S 13/06 |

OTHER PUBLICATIONS

Anonymous, "Method and System for Extending Aerial Drone Flight Range based on Dynamic Wind Data." IP.com Disclosure No. IPCOM000247909D, Publication Date: Oct. 11, 2016, 5 pages.

C. Ruiz et al., "Collaborative Localization and Navigation in Heterogeneous UAV swarms: Demo Abstract." In Proceedings of the 14th ACM Conference on Embedded Network Sensor Systems CD-ROM (SenSys '16). ACM, New York, NY, USA, 324-325, 2016.

\* cited by examiner

300A

300B

DRONE FLIGHT OPTIMIZATION USING DRONE-TO-DRONE PERMISSIONING

BACKGROUND

The present invention generally relates to navigation systems, and more specifically, to drone flight optimization using drone-to-drone permissioning.

In today's environment, drones are used in many applications ranging obtaining aerial images/video and delivery of goods. Drones include sensors and cameras to obtain images and other signals that can aid in guiding the drone to its destination. In addition, the drones can be configured to carry cargo to its targeted destination. As the proliferation of drones continues to develop into commercial and industrial applications, there is an increasing need to improve autonomous flight paths and optimize battery usage to encourage longer, uninterrupted flights to their destination.

SUMMARY

Embodiments of the present invention are directed to a computer-implemented method for drone flight optimization using drone-to-drone permissioning. A non-limiting example of the computer-implemented method includes determining a potential route for a first drone, and broadcasting the potential route to one or more drones of a network of drones. The computer-implemented method also includes receiving path information and routing condition information associated with the potential route from the one or more drones of the network of drones, and updating the potential route of the first drone based at least in part on the path information and routing condition information.

Embodiments of the present invention are directed to a system for drone flight optimization using drone-to-drone permissioning. A non-limiting example of the system includes a storage medium, the storage medium being coupled to a processor. The processor is configured to determine a potential route for a first drone, and broadcast the potential route to one or more drones of a network of drones. The processor is configured to receive path information and routing condition information associated with the potential route from the one or more drones of the network of drones, and update the potential route of the first drone based at least in part on the path information and routing condition information.

Embodiments of the invention are directed to a computer program product for drone flight optimization using drone-to-drone permissioning, the computer program product comprising a computer readable storage medium having program instructions embodied therewith. The program instructions are executable by a processor to cause the processor to perform a method. A non-limiting example of the method includes determining a potential route for a first drone, and broadcasting the potential route to one or more drones of a network of drones. The method also includes receiving path information and routing condition information associated with the potential route from the one or more drones of the network of drones, and updating the potential route of the first drone based at least in part on the path information and routing condition information.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
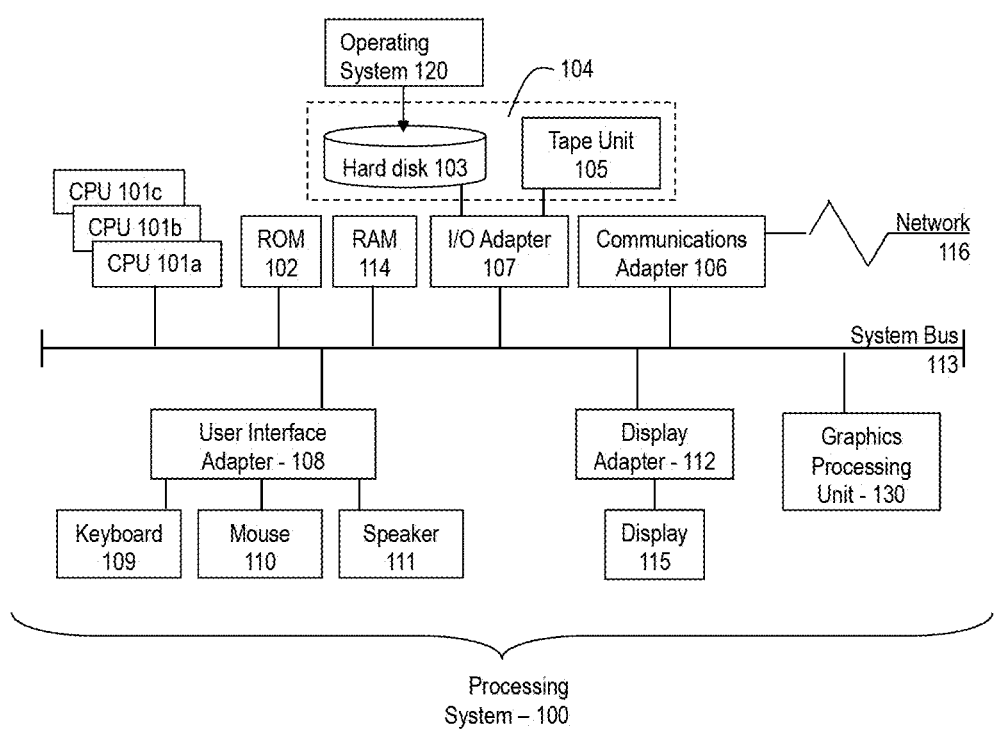
FIG. 1 is a block diagram illustrating one example of a processing system for practice of the teachings herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that is more specifically relevant to aspects of the invention, drones can be configured in an autonomous mode and must be configured to safely navigate from its origin to its destination without any collisions. Drones are generally controlled by a main or central controller that is configured to communicate with the drones as they travel from an origin to the destination using long-range communication techniques. The drones are equipped with sensors, cameras, GPS, graphic units processor(s), etc. that assist the drones during its flight. As drones travel there may be areas of interference, obstruction, or so-called blind-spots that can interrupt the connectivity between the drones and the main controller. There may be a need to improve autonomous flight paths and optimize battery usage to encourage longer, uninterrupted flight to their destinations when a loss of connectivity to the central controller occurs.

The techniques described herein provide for crowd sourced permissioning among a network of autonomous drones to determine an optimal flight path in the event that connectivity to a central controller is lost. The connectivity can be lost due to blind spots such as tunnels or obstructed areas (buildings, etc.), areas where communications jamming occurs (due to interfering or jamming devices), or other remote areas without connectivity. In addition, the techniques provide for a method to optimize battery usage, obstacle avoidance and overall efficiency, by powering down one or more sensors or putting one or more sensors of the autonomous drone in sleep mode during flight to increase flight time. For example, the sensor cluster (GPS, radar, camera, etc.) can be voluntarily shut down to achieve savings in power, fuel, or in the event of a failure. In addition, the techniques described herein enable drones within proximity of a given drone to guide the drone to a destination. In the event of the failure of one or more sensors of the sensor cluster, the surrounding drones can guide the distressed drone safely to its destination or to a safe landing.

The techniques described herein provide for drone-to-drone aggregation of historical travel paths to autonomously route an outbound drone on the most efficient pathway in real-time. In addition, the autonomous peer-to-peer routing increases the efficiency by eliminating the need for high power consuming components, heaving components for cameras, long-range communication transmitters, and advanced 3-D video processing elements. In one or more embodiments, the cluster of drones can communicate with each other to guide the drones to its destination without the control of a central controller.

Turning now to an overview of the aspects of the invention, one or more embodiments of the invention address the above-described shortcomings of the prior art by providing techniques for exchanging routing condition information and path information using drone-to-drone communication to optimize travel paths to select safer and more efficient routes.

The above-described aspects of the invention address the shortcomings of the prior art by drive routing decisions in real-time rather than through existing 3-D image processing via onboard camera, in the event of drone's camera, radar, or collision systems are compromised. As such, a cluster or network of drones can perform drone-to-drone communication to determine safe flight patterns and guide the drones to its safe landing or a safe landing site, minimizing the unnecessary collision or loss during movement.

Turning now to a more detailed description of aspects of the present invention, FIG. 1 depicts an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112.

A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
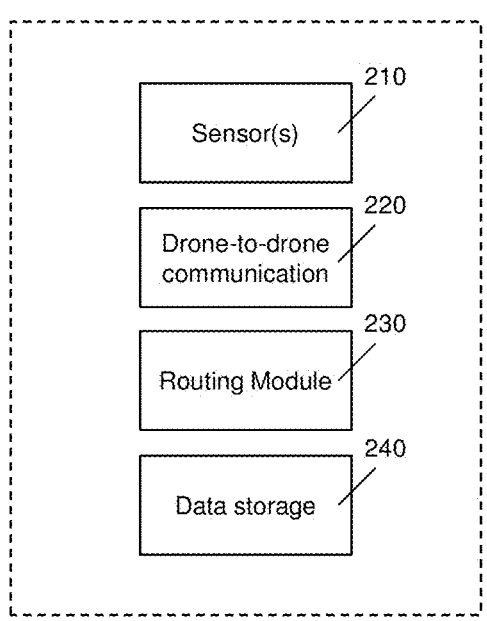
FIG. 2 depicts a drone architecture in accordance with one or more embodiments of the invention.

Now referring to FIG. 2, an architecture for a drone 200 in accordance with one or more embodiments is shown. The architecture can include one or more components of system 100. As shown in FIG. 2, the drone 200 includes a plurality of modules and components and it is to be understood that various configurations and arrangements can be implemented in the architecture.

As shown in FIG. 2, the drone 200 includes a plurality of sensors 210. These sensors 210 can include image capturing devices such as cameras, GPS, weather sensors, gyrometers and accelerometers. In addition, other types of sensors 210 can be included to detect wind, resistance, traffic, air density, time, etc.

The drone 200 can also include a drone-to-drone communication module 220. The drone-to-drone communication module 220 includes an interface that is configured to exchange data with other drones within proximity of a given drone. The data that is exchanged can include but is not limited to, weather information, elevation information, speed information, etc. In one or more embodiments, the drone-to-drone communication module 220 is configured to establish a network of drones and exchange data that has been detected by the sensors 210 and can be stored in the data storage 240.

The routing module 230 of the drone 200 is configured to determine a path from an origin to a target destination. The routing decisions can include path information, elevation information, speed information, directional information, etc. The routing module 230 is configured to make the routing decisions based on one or more sources of inputs such as from a central controller or other drones that are in proximity of the drone 200. For example, the routing module 230 is configured to receive inputs from an operator and/or central controller. In addition, the routing module 230 can be configured to make routing decisions based on positioning signals such as GPS or perhaps other long-range and short-range signals. The routing module 230 is also configured to receive inputs from other drones such as weather and obstruction condition information. It is to be understood that other signals indicating various types of data can be used in order to make routing decisions for the drone. It is to be understood that a different architecture including different components and arrangement for the drone 200 can be used in the drone permissioning system.

Figure 3A:
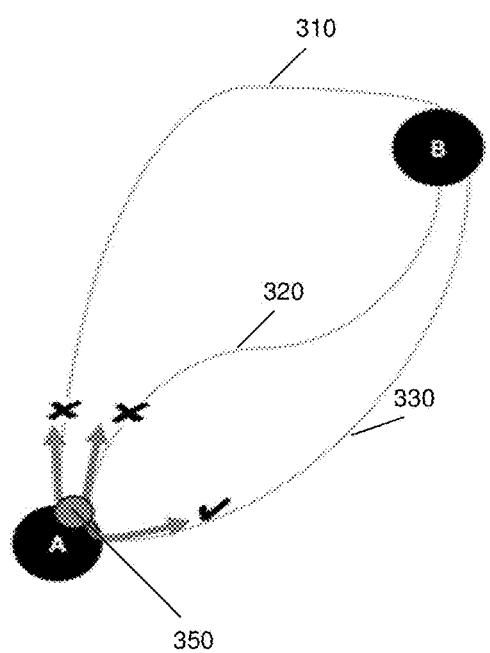
FIGS. 3A and 3B depict a mapping diagram of multiple route paths in accordance with one or more embodiments.
Figure 3B:
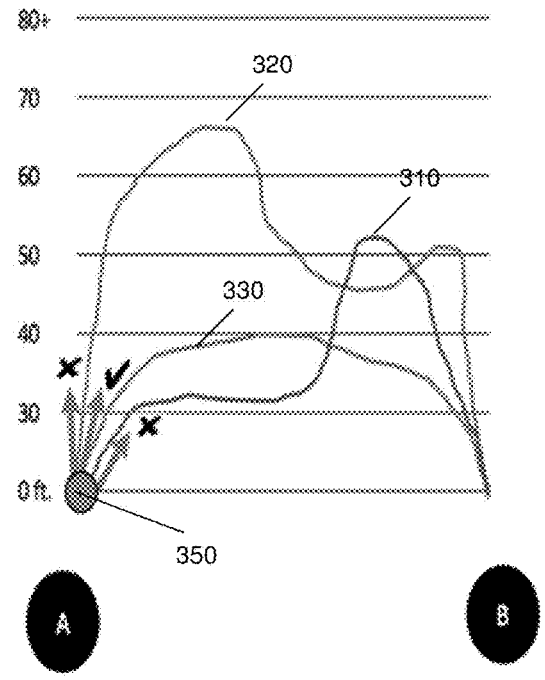

FIGS. 3A and 3B paths traveled by a plurality of drones using drone-to-drone permissioning for flight optimization. In FIG. 3A illustrates an example of overhead flight paths of a plurality of drones, and FIG. 3B illustrates an example of elevation flight paths of a plurality of drones. The diagrams represent an analysis that may be conducted across multiple drones flying in a localized area. The diagrams illustrate the travel paths and elevation for three different autonomous drones. Additional data can be recorded by the drones such as temperature, time, direction, pitch, yaw, etc. and can be associated with travel paths between an origin and destination.

In the event, a subsequent drone enters the area previously traveled by other drones; the drone broadcasts its potential route to the other drones present in the area. According to the paths and conditions experienced reported by other drones in the area, the path can be diverted/redirected based on the optimal path given the current conditions. The selected path is the optimal path according to the information received from all drones in the area.

In FIG. 3A the diagram 300A depicts three different paths that were previously traveled by three different drones between an origin A and destination B. The drone path 310 as shown is traveling in the leftmost path. The drone path 320 is shown traveling in the path central to the origin A and destination B. The drone path 330 is shown traveling in the rightmost path 330. As can be illustrated in the example with reference to FIG. 4, the drone 350 has selected the drone path 330 as the safest and/or most efficient.

In FIG. 3B the diagram 300B depicts the elevation path traveled by the drones between the origin A and destination B. The x-axis of the graph represents the distance between the origin A and destination B, and the y-axis represents the elevation of each respective drone as it travels towards the destination B. The drone paths 310, 320, and 330 correspond to the paths of FIG. 3A. As can be illustrated in the example with reference to FIG. 4, the drone 350 has selected the drone path 330 as the safest and/or most efficient. It should be understood the paths can include historical paths or real-time path information from drones that are currently traveling towards the destination.

Figure 4:
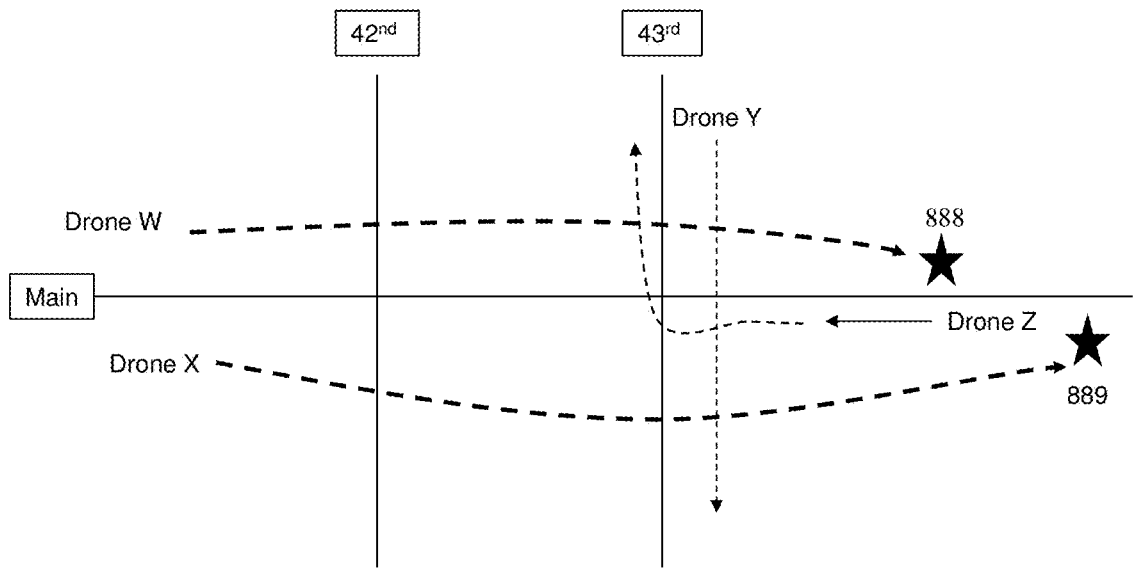
FIG. 4 an example of a mapping diagram of path analysis in accordance with one or more embodiments.

Now referring to FIG. 4, an example diagram 400 is provided for the drone-to-drone flight permissioning system. In this non-limiting example, drones W, X, Y, and Z are part of a package deliver autonomous cluster/team and share various routing paths in a region. Several deliveries are being made into an area where connectivity has been compromised due to interference from structures and obstacles in the area. As a result, communications are temporarily lost such as communication to a central controller.

Drone W travels down Main St. to deliver a package to the destination 888, and drone X also travels down Main St. en route to the destination 889. Drone W encounters a crosswind as it crosses the intersection of Main St. and $42^{nd}$ St impacting the balance of drone W and temporarily delays its flight. The altitude, speed, time, etc. are recorded on the drone.

As drone X approaches the intersection of Main St. it broadcasts its path to the other drones in the area. Nearby, drone W communicates crosswind experienced at 100 feet. Responsive to the communication, drone X lowers its altitude and travels across the intersection of Main St. and $42^{nd}$ St, where a slight crosswind is still experienced but without as significant of an impact. Again, the altitude, speed, time, etc. are recorded on drone W.

Subsequently, drone Y is traveling down $43^{rd}$ St. and crosses over Main St. where no wind or obstruction is detected. Next, drone Z is traveling down Main St. and is two blocks away from the intersection of Main St. and $42^{nd}$ St. Drone Z broadcasts its path to all nearby drones, and drone Y broadcasts a candidate re-routing path taking $43^{rd}$ St. Calculations, either by drone Z or the network drones, are performed and it is determined the candidate route results in a shorter travel time and drone Z changes its route accordingly (represented by the dashed line of drone Z).

Figure 5:
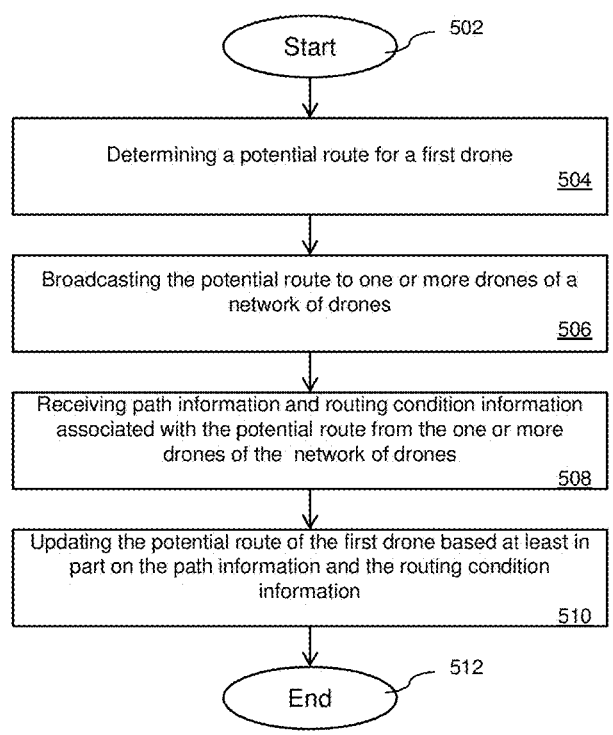
FIG. 5 depicts a flowchart of a method for performing drone flight optimization using drone to drone permissioning in accordance with one or more embodiments.

Now referring to FIG. 5, a flowchart of a method 500 for drone flight optimization using drone-to-drone permissioning in accordance with one or more embodiments of the invention. The method 500 begins at block 502 and proceeds to block 504 which provides for determining a potential route for a first drone. In a non-limiting example, an autonomous drone can receive an assignment for a delivery application between an origin and destination.

Next, the method 500 continues to block 506 which provides for broadcasting the potential route to one or more drones of a network of drones. The drones are equipped with the appropriate communication interfaces for drone-to-drone communication where each drone is configured to transmit the route path information to other drones that are within proximity.

At block 508, the method 500 provides for receiving path information and routing condition information associated with the potential route from the one or more drones of the network of drones. The path information can include path information of other drones that are common to the potential route of the first drone. The routing conditions information can include various types of information including but not limited to wind, resistance, traffic, air density, temperature, obstructions, etc. This information can be transmitted to the drone that has broadcasted its route to determine if its initial path should be altered.

In one or more embodiments of the invention, the path information and the routing condition information are subject to a decay factor where the information is only valid for a period of time. In other embodiments, a weight can be associated with the path information where the closer in time the path information and routing information is used for determining a route of the first drone, the higher the weight is given in determining the route. Alternatively, the older the data is the less weight is given to the data.

The method 500 at block 510 provides for updating the potential route of the first drone based at least in part on the path information and the routing condition information. In one or more embodiments of the invention, the path information and the routing condition information can be a combination of real-time and historical data that can be used to make routing decisions for a drone as it is traveling to its destination. The information can indicate that rough winds have been experienced along the path the drone should re-route its initial path. The method 500 ends at block 512.

In one or more embodiments of the invention, the drones can be configured to fly independently of the central controller and under the control of a cluster of neighboring drones. As such, a first drone can be guided to its destination using the path and routing condition information provided from the cluster of network drones. In addition, the drones can be configured to turn off or reduce power supplied to one or more of its sensors and processors such as a camera and graphics processors, to conserve power of the drone. Also, the long-range transmitters/receives can be powered down or reduced to further conserve the power and computing resources of the drone. In some embodiments, one of the drones of the cluster of drones can maintain connectivity to a central controller and relay information from the central controller to the other drones in the network, however the connectivity may not be required.

In one or more embodiments of the invention, the drones, such as the drone 200 shown in FIG. 2, are configured to detect a failure in one or more of its sensors that are used to guide the drone to its destination. In the event a failure is detected, such as a failure with its GPS, radar, camera, etc., the drone can transmit a distressed signal to the other drones within its proximity. After the distressed drone receives a response from the one or more drones, drone-to-drone communication can be used to guide the distressed drone safely to its destination or guide the drone to a safe landing zone to avoid any collisions. This technique provides an added benefit for failure contingency. In another embodiment of the invention, the distressed signal can be transmitted to other drones within its proximity when the drone 200 is located in a "blind-spot," that is, where the drone 200 does not have a connection to a central controller due to interference or some other factor.

Figure 6:
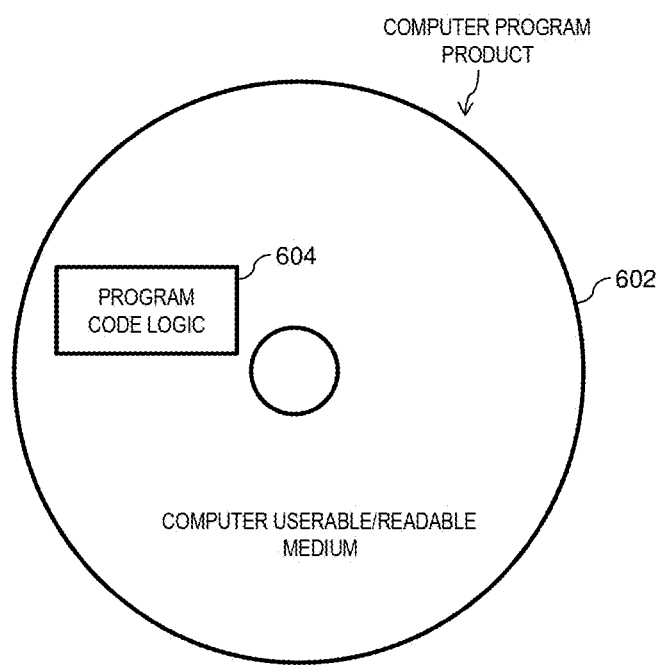
FIG. 6 depicts a computer program product in accordance with an embodiment in accordance with one or more embodiments.

Referring now to FIG. 6, a computer program product 600 in accordance with an embodiment that includes a computer-readable storage medium 602 and program instructions 604 is generally shown.

The techniques described herein improve over the prior art by using drone-to-drone communication to obtain path and routing condition information for making routing decisions for a drone that has potentially lost connectivity with the main controller. The drones can be configured to be guided to a destination without connectivity to the main controller and only using drone-to-drone communication with other drones in the network or cluster of a given drone. The routes taken by the drone can be selected to determine the safest path, fastest path, etc.

Using the techniques described herein, the drones can be safely and efficiently guided through densely populated areas when operated for applications such as home delivery. In addition, increased resource savings and computing resources savings are realized by eliminating and/or reducing the consumed power of components such as a camera and its associated graphical processor used to analyze the surrounding area of a drone. In addition, long-range communication/transmitter/receiver, proximity sensors, radars, etc. can be potentially powered down or enter a sleep state (low power mode) for a period of time.

The technical effects and benefits allow for an autonomous drone to maintain a flight path to the targeted destination even in the event of communication loss to the central controller. The technical effects and benefits provide for optimal path selection based on aggregated historical travel paths to autonomously route an outbound drone the most efficient pathway in real-time. The technical effects and benefits provide for minimizing the risk of unnecessary collisions or loss during movement.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for drone flight optimization using drone to drone permissioning, the computer-implemented method comprising:

determining a potential route for a first drone, wherein the first drone comprises one or more sensors to guide the first drone to a destination during flight, wherein at least one of the one or more sensors include a global positioning system (GPS);

broadcasting the potential route to one or more drones of a network of drones;

receiving path information and routing condition information associated with the potential route from the one or more drones of the network of drones responsive to the broadcasted potential route, wherein the routing condition information comprises at least one of the destination, a travel path, elevation information, obstruction information, and weather condition information, wherein the routing condition information is subject to a decay value factor;

updating the potential route of the first drone based at least in part on the path information and the routing condition information;

determining whether connectivity between the first drone and a central controller exists during the flight;

responsive to determining there is no connectivity, performing drone-to-drone communication to a cluster of drones of the network of drones to guide the first drone to the destination, wherein at least one drone of the cluster of drones maintains connectivity to the central controller;

reducing power to the GPS of the first drone that is operational during the flight to optimize battery usage;

detecting a failure of the GPS of the first drone during the flight;

responsive to detecting the failure of the GPS of the first drone, transmitting a distressed signal to one or more drones in proximity of the first drone and switching off the failed GPS of the first drone in the event of the failure; and responsive to receiving a response to the distressed signal from a drone of the one or more drones in proximity of the first drone, guiding the first drone to a safe landing zone using the drone-to-drone communication.

2. The computer-implemented method of claim 1, wherein the path information comprises at least one of historical path information or real-time path information.

3. The computer-implemented method of claim 1, wherein the drone-to-drone communication establishes the network of drones based at least in part on receiving broadcasted information from the one or more drones in proximity of the first drone.

4. The computer-implemented method of claim 1, further comprising detecting the routing condition information associated with the potential route.

5. The computer-implemented method of claim 1, further comprising broadcasting, by the first drone, the routing condition information and the updated potential route information to the one or more drones of the network of drones.

6. A system for implementing drone flight optimization using drone-to-drone permissioning, the system comprising:
   a storage medium, the storage medium being coupled to a processor;
   the processor configured to:
      determine a potential route for a first drone, wherein the first drone comprises one or more sensors to guide the first drone to a destination during flight, wherein at least one of the one or more sensors include a global positioning system (GPS);
      broadcast the potential route to one or more drones of a network of drones;
      receive path information and routing condition information associated with the potential route from the one or more drones of the network of drones responsive to the broadcasted potential route, wherein the routing condition information comprises at least one of the destination, a travel path, elevation information, obstruction information, and weather condition information, and wherein the path information comprises at least one of historical path information or real-time path information, wherein the routing condition information is subject to a decay value factor;
      update the potential route of the first drone based at least in part on the path information and the routing condition information;
      determine whether connectivity between the first drone and a central controller exists during the flight;
      responsive to determining there is no connectivity, perform drone-to-drone communication to a cluster of drones of the network of drones to guide the first drone to the destination, wherein at least one drone of the cluster of drones maintains connectivity to the central controller;
      reduce power to the GPS of the first drone that is operational during the flight to optimize battery usage;
      detect a failure of the GPS of the first drone;
      responsive to detecting the failure of the GPS of the first drone, transmit a distressed signal to one or more drones in proximity of the first drone and switch off the failed GPS of the first drone in the event of the failure; and
      responsive to receiving a response to the distressed signal from a drone of the one or more drones in proximity of the first drone, guide the first drone to a safe landing zone using the drone-to-drone communication.

7. The system of claim 6, wherein the drone-to-drone communication establishes the network of drones based at least in part on receiving broadcasted information from the one or more drones in proximity of the first drone.

8. The system of claim 6, wherein the processor is further configured to detect the routing condition information associated with the potential route, and broadcast, by the first drone, the routing condition information and the updated potential route information to the one or more drones of the network of drones.

9. A computer program product for performing drone flight optimization using drone-to-drone permissioning, the computer program product comprising a non-transitory computer-readable storage medium having program instructions embodied therewith, the program instructions executable by a processor to cause the processor to:
   determine a potential route for a first drone, wherein the first drone comprises one or more sensors to guide the first drone to a destination during flight, wherein at least one of the one or more sensors include a global positioning system (GPS);
   broadcast the potential route to one or more drones of a network of drones;
   receive path information and routing condition information associated with the potential route from the one or more drones of the network of drones responsive to the broadcasted potential route, wherein the routing condition information comprises at least one of the destination, a travel path, elevation information, obstruction information, and weather condition information, and wherein the path information comprises at least one of historical path information or real-time path information, wherein the routing condition information is subject to a decay value factor;

update the potential route of the first drone based at least in part on the path information and the routing condition information;

determine whether connectivity between the first drone and a central controller exists during the flight;

responsive to determining there is no connectivity, perform drone-to-drone communication to a cluster of drones of the network of drones to guide the first drone to the destination, wherein at least one drone of the cluster of drones maintains connectivity to the central controller;

reduce power to the GPS of the first drone that is operational during the flight to optimize battery usage;

detect a failure of the GPS of the first drone during the flight;

responsive to detecting the failure of the GPS of the first drone, transmit a distressed signal to one or more drones in proximity of the first drone and switch off the failed GPS of the first drone in the event of the failure; and responsive to receiving a response to the distressed signal from a drone of the one or more drones in proximity of the first drone, guide the first drone to a safe landing zone using the drone-to-drone communication.

10. The computer program product of claim 9, wherein the instructions are further executable by the processor to cause the processor to detect the routing condition information associated with the potential route, and broadcast, by the first drone, the routing condition information and the updated potential route information to the one or more drones of the network of drones.

* * * * *